US012566851B2

(12) United States Patent
Orazio et al.

(10) Patent No.: US 12,566,851 B2
(45) Date of Patent: Mar. 3, 2026

(54) DETECTING AND ASSESSING EVIDENCE OF MALWARE INTRUSION

(71) Applicant: International Business Machines Corporation, Armonk, NY (US)

(72) Inventors: Arielle Tovah Orazio, Wood-Ridge, NJ (US); Matthias Seul, Pleasant Hill, CA (US); Lloyd Wellington Mascarenhas, White Plains, NY (US); Christopher Pepin, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 17/443,464

(22) Filed: Jul. 27, 2021

(65) Prior Publication Data

US 2023/0035918 A1 Feb. 2, 2023

(51) Int. Cl.
*G06F 21/56* (2013.01)
*G06F 21/55* (2013.01)

(52) U.S. Cl.
CPC .......... *G06F 21/562* (2013.01); *G06F 21/554* (2013.01); *G06F 2221/034* (2013.01)

(58) Field of Classification Search
CPC . G06F 21/562; G06F 21/554; G06F 2221/034
See application file for complete search history.

(56) References Cited

U.S. PATENT DOCUMENTS

| | | | | |
|---|---|---|---|---|
| 9,189,627 B1 * | 11/2015 | Islam | .................. | H04L 63/1408 |
| 9,367,687 B1 * | 6/2016 | Warshenbrot | ......... | G06F 21/565 |
| 9,692,778 B1 * | 6/2017 | Mohanty | ............. | G06F 9/45533 |
| 10,565,373 B1 * | 2/2020 | Rao | ........................ | G06F 21/566 |
| 10,749,890 B1 * | 8/2020 | Aloisio | ................. | H04L 41/142 |
| 11,443,035 B2 * | 9/2022 | Chhabra | .............. | H04L 67/306 |
| 2002/0133710 A1 * | 9/2002 | Tarbotton | .............. | G06F 21/562 |
| | | | | 713/188 |
| 2006/0185016 A1 * | 8/2006 | Sitze | ..................... | G06F 21/562 |
| | | | | 726/24 |
| 2008/0120699 A1 * | 5/2008 | Spear | ..................... | H04L 63/10 |
| | | | | 709/225 |
| 2013/0096980 A1 * | 4/2013 | Basavapatna | .......... | G06Q 10/00 |
| | | | | 705/7.28 |

(Continued)

FOREIGN PATENT DOCUMENTS

GB 201601844 3/2016

OTHER PUBLICATIONS

"chrome.history—Chrome Developers", printed on May 20, 2021, 3 pages, <https://developer.chrome.com/docs/extensions/reference/history/>.

(Continued)

*Primary Examiner* — Carl G Colin
*Assistant Examiner* — Zhe Liu
(74) *Attorney, Agent, or Firm* — Stephen R. Yoder

(57) ABSTRACT

Approaches presented herein enable detecting and assessing evidence of malware intrusion. More specifically, scans of a system are performed, where the scans detect evidence of malware intrusion, and each of the scans generates a respective result. A severity score is assigned to each respective result of the scans, and an assessment score for the system is computed based on the severity score assigned to each respective result of the scans.

18 Claims, 4 Drawing Sheets

(56) References Cited

U.S. PATENT DOCUMENTS

| | | | |
|---|---|---|---|
| 2014/0130157 A1* | 5/2014 | Sallam | G06F 21/561 |
| | | | 726/23 |
| 2014/0237598 A1* | 8/2014 | Bank | H04L 63/1416 |
| | | | 726/24 |
| 2016/0078225 A1* | 3/2016 | Ray | G06F 21/552 |
| | | | 726/23 |
| 2017/0093902 A1* | 3/2017 | Roundy | G06F 21/554 |
| 2017/0118240 A1* | 4/2017 | Devi Reddy | G06N 20/00 |
| 2017/0337379 A1* | 11/2017 | Johar | G06F 21/552 |
| 2018/0077188 A1* | 3/2018 | Mandyam | H04L 67/01 |
| 2018/0121653 A1* | 5/2018 | Akita | G06F 21/84 |
| 2019/0034633 A1* | 1/2019 | Seetharamaiah | G06F 9/45558 |
| 2019/0065744 A1* | 2/2019 | Gaustad | G06N 3/09 |
| 2019/0121978 A1 | 4/2019 | Kraemer | |
| 2019/0132419 A1* | 5/2019 | Wang | G06F 9/4881 |
| 2019/0163900 A1* | 5/2019 | Zhang | G06N 20/00 |
| 2019/0265994 A1 | 8/2019 | Tas | |
| 2019/0379678 A1* | 12/2019 | McLean | G06F 16/285 |
| 2019/0384911 A1* | 12/2019 | Caspi | G06N 3/045 |
| 2020/0050761 A1* | 2/2020 | Lancioni | G06F 21/566 |
| 2020/0053109 A1 | 2/2020 | Lancioni | |
| 2020/0120126 A1* | 4/2020 | Ocepek | H04L 63/1433 |
| 2020/0175165 A1 | 6/2020 | Murphy | |
| 2021/0029156 A1* | 1/2021 | Sharifi Mehr | H04L 67/303 |
| 2021/0075820 A1* | 3/2021 | Murphy | H04L 67/30 |
| 2021/0173928 A1* | 6/2021 | Grafi | G06F 21/44 |
| 2021/0194891 A1* | 6/2021 | Burke | H04L 63/1416 |
| 2022/0292194 A1* | 9/2022 | Edwards | G06F 9/485 |

OTHER PUBLICATIONS

"Downloads.rdf—MozillaZine Knowledge Base", mozillaZine, accessed on May 20, 2021, 2 pages, <http://kb.mozillazine.org/Downloads.rdf>.

"Fileless Malware Attacks : Intro—Digital Forensics", accessed on May 20, 2021, 10 pages, <https://d3pakblog.wordpress.com/2018/05/05/d34n6_fileless-malware-at-digital-forensic>.

"IBM X-Force Exchange API Documentation", accessed on May 20, 2021, 191 pages, <https://api.xforce.ibmcloud.com/doc/#URL_get_url_malware_url>.

"Places sqlite—MozillaZine Knowledge Base", last modified, Sep. 27, 2011, 2 pages, <http://kb.mozillazine.org/Places.sqlite>.

Graeber, Matt, "Abusing Windows Management Instrumentation (WMI) to Build a Persistent, Asyncronous, and Fileless Backdoor", Black Hat 2015, 25 pages.

Hajmasan et al., "Dynamic Behavior Evaluation for Malware Detection," 2017 5th International Symposium on Digital Forensic and Security (ISDFS), Tirgu Mures, Romania, © 2017, IEEE, 6 pages.

Kyadige et al., "Learning from Context: A Multi-View Deep Learning Architecture for Malware Detection," 2020 IEEE Security and Privacy Workshops (SPW), San Francisco, CA, USA, 7 pages.

* cited by examiner

300

| INDICATORS OF COMPROMISE | INTRUSION TECHNIQUE IDENTIFIED | CHANCES OF COMPROMISE | SCORE |
|---|---|---|---|
| WINDOWS MANAGEMENT INSTRUMENTATION<br>PROCESS INJECTION<br>SIGNED BINARY PROXY EXECUTION WITHOUT USER'S KNOWLEDGE<br>BOOT OR AUTO-LOGON<br>EXFILTRATION OVER WEB SERVICES OR OTHER MEDIUM | EXECUTION,<br>DEFENSE EVASION<br>PERSISTENCE<br>EXFILTRATION | CRITICAL | 0.85 |
| DE-OBFUSCATING OR DECODING FILES OR INFO<br>PRE-OS BOOT<br>LATERAL TOOL TRANSFER<br>INPUT CAPTURE OR CACHE EXPLOITATION | DEFENSE EVASION<br>LATERAL MOVEMENT /LIVING OF THE LAND<br>CREDENTIAL THEFT<br>COLLECTION | MEDIUM | 0.5 |
| USE OF ALTERNATE MODE OF AUTHENTICATION<br>SESSION HIGH-JACKING OR DENIAL OF SERVICE<br>DRIVE BY COMPROMISE<br>OFFICE APPLICATION STARTUP AND AUTO UPDATING FROM POTENTIALLY ILLEGITIMATE SITE<br>STEALING OF WEB SESSION COOKIES | LATERAL MOVEMENT<br>INITIAL ACCESS<br>PERSISTENCE TECHNIQUE<br>CREDENTIAL ACCESS | HIGH | 0.7 |
| DELIVERY OF PAYLOADS<br>CHANGING OR MODIFYING ACCESS AND CONTROL<br>MALICIOUS MACROS<br>USE OF NON-STANDARD PORTS | PRIVILEGE ESCALATION<br>OPERATING SYSTEM AGNOSTIC<br>COMMAND AND CONTROL | HIGH | 0.72 |
| APPLICATION NOT WORKING PROPERLY<br>. WINDOWS AUTO UPDATE | MIS CONFIGURATION | LOW | 0.2 |

SCORE LEGEND:
CRITICAL = 0.81 TO 1
HIGH= 0.8 TO 0.7
MEDIUM= 0.31 TO 0.69
LOW= 0.3 TO 0

TOTAL SCORE:
IF ABOVE 2.5, IT IS
FLAGGED - FORENSICS
REPORT CREATED

TOTAL: 2.97

FIG. 3

DETECTING AND ASSESSING EVIDENCE OF MALWARE INTRUSION

TECHNICAL FIELD

The present invention relates generally to detecting and assessing evidence of malware intrusion and, more specifically, to scanning a system to detect evidence of malware intrusion, and computing an assessment score for the system based on the results of the scans.

BACKGROUND

Malware is software that is designed to attack and cause damage to computer systems, servers, clients, or computer networks. Different types of malware have come into existence, for example: computer viruses, worms, Trojan horses, ransomware, and spyware. Malware has manifested itself in numerous different forms, which leave varying evidence of its presence.

SUMMARY

Approaches presented herein enable detecting and assessing evidence of malware intrusion. More specifically, scans of a system are performed, where the scans detect evidence of malware intrusion, and each of the scans generates a respective result. A severity score is assigned to each respective result of the scans, and an assessment score for the system is computed based on the severity score assigned to each respective result of the scans.

One aspect of the present invention includes a computer-implemented method for detecting and assessing evidence of malware intrusion, comprising: performing one or more scans of a system, wherein the one or more scans detect evidence of malware intrusion, and wherein each of the one or more scans generates a respective result, assigning a severity score to each respective result of the one or more scans, and computing an assessment score for the system based upon the severity score assigned to each respective result of the one or more scans.

Another aspect of the present invention includes a computer system for detecting and assessing evidence of malware intrusion, the computer system comprising: a memory medium comprising program instructions, a bus coupled to the memory medium, and a processor, for executing the program instructions, coupled to a malware evidence detection engine via the bus that when executing the program instructions causes the system to: perform one or more scans of a system, wherein the one or more scans detect evidence of malware intrusion, and wherein each of the one or more scans generates a respective result, assign a severity score to each respective result of the one or more scans, and compute an assessment score for the system based upon the severity score assigned to each respective result of the one or more scans.

Yet another aspect of the present invention includes a computer program product for detecting and assessing evidence of malware intrusion, the computer program product comprising a computer readable hardware storage device, and program instructions stored on the computer readable hardware storage device, to: perform one or more scans of a system, wherein the one or more scans detect evidence of malware intrusion, and wherein each of the one or more scans generates a respective result, assign a severity score to each respective result of the one or more scans, and compute an assessment score for the system based upon the severity score assigned to each respective result of the one or more scans.

Still yet, any of the components of the present invention could be deployed, managed, serviced, etc., by a service provider who offers to detect and assess evidence of malware intrusion in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which:

FIG. 3 shows a system forensic report according to illustrative embodiments.

Figure 1:
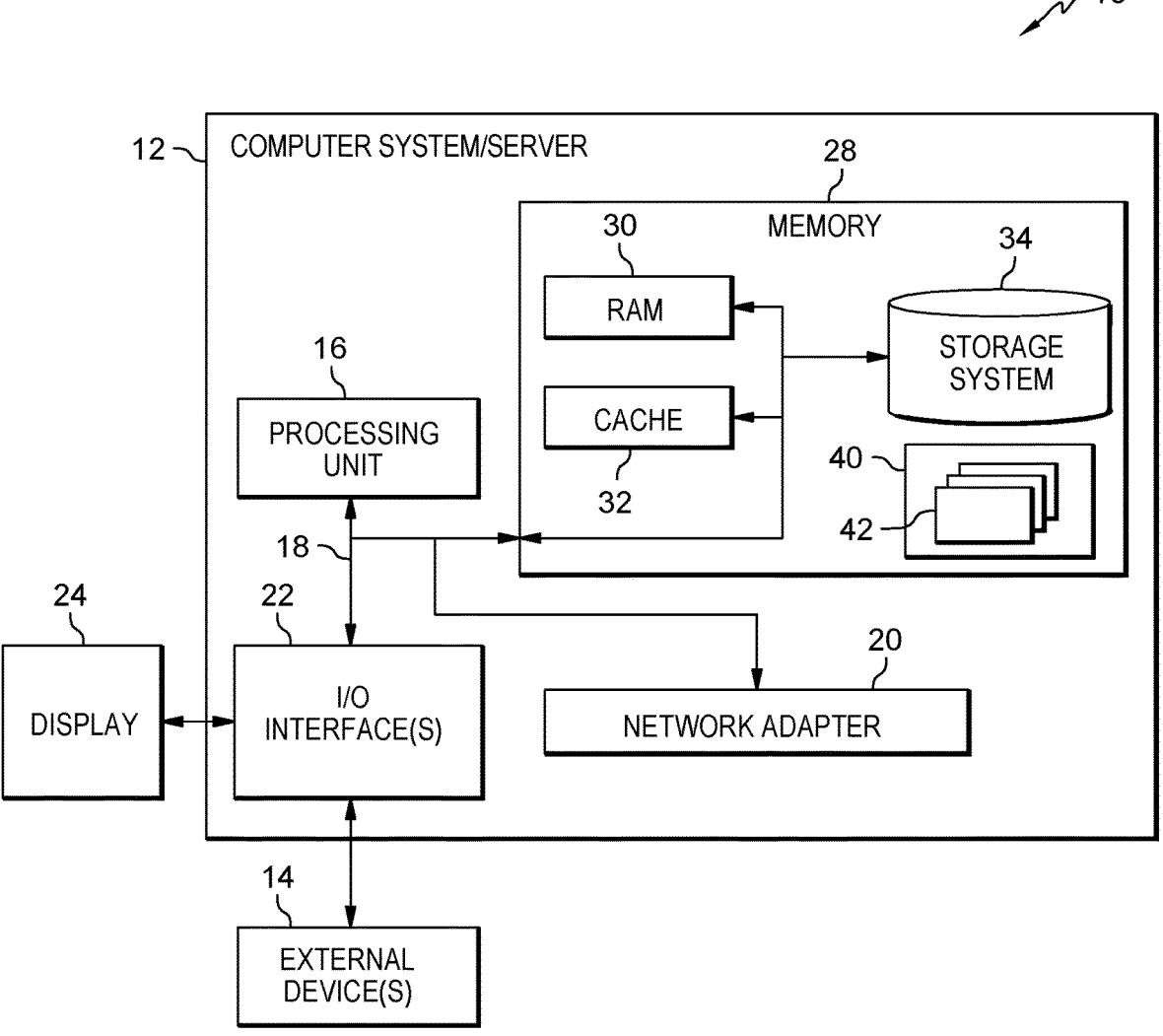
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for detecting and assessing evidence of malware intrusion. More specifically, scans of a system are performed, where the scans detect evidence of malware intrusion, and each of the scans generates a respective result. A severity score is assigned to each respective result of the scans, and an assessment score for the system is computed based on the severity score assigned to each respective result of the scans.

Referring now to FIG. 1, a computerized implementation 10 of an embodiment for detecting and assessing evidence of malware intrusion will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for detecting and assessing evidence of malware intrusion. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for detecting and assessing evidence of malware intrusion, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that malware, especially file-less forms of malware, oftentimes does not leave any usual traces of its existence such as executable code in storage. Accordingly, known approaches to detect malware, for example anti-virus tools, may not effectively detect and remediate some forms of malware.

Accordingly, the inventors of the present invention have developed an approach for computing an assessment score based on scanning potentially vulnerable files and system components. The assessment score may be used to determine a level of scrutiny that can be applied to a system, and an amount of forensic examination and follow-up that may be needed to remediate the system.

Moreover, embodiments of the present invention provide for assessing system integrity and trustworthiness of a system after a potential malware attack may have occurred, without requiring real-time or near real-time observation of potential malware attacks.

Figure 2:
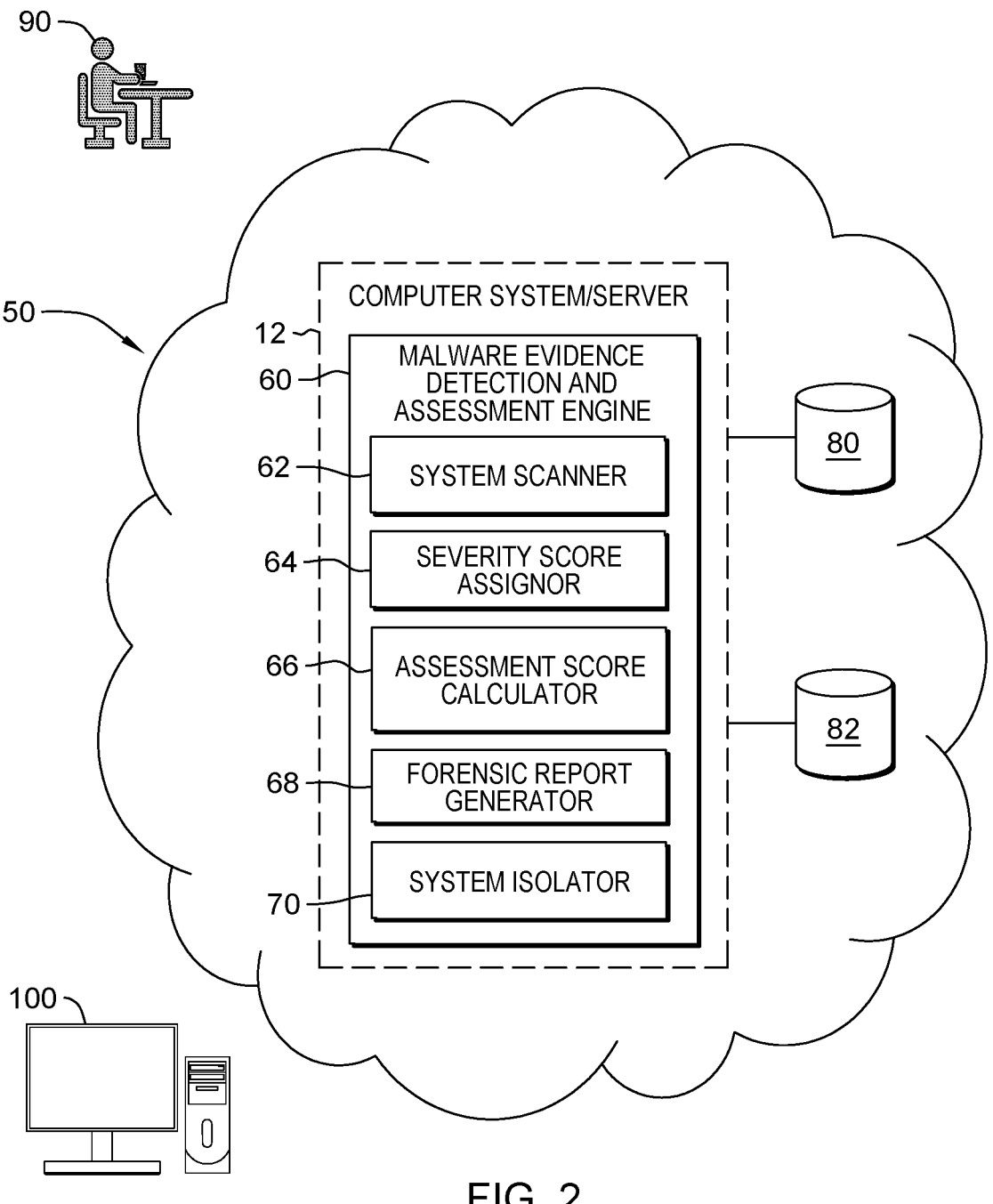
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 2 for illustrative purposes only. In the event the teachings recited herein are practiced in a networked computing environment, each client need not have a malware evidence detection and assessment engine 60 (hereinafter "system 60"). Rather, all or part of system 60 could be loaded on a server or server-capable device that communicates (e.g., wirelessly) with the clients to provide for malware evidence detection and assessment. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions. Specifically, among other functions, system 60 can detect and assess evidence of malware intrusion in a networked computing environment. To accomplish this, system 60 can include a set of components (e.g., program modules 42 of FIG. 1) for carrying out embodiments of the present invention. These components can include, but are not limited to, system scanner 62, severity score assignor 64, assessment score calculator 66, forensic report generator 68, and system isolator 70. Through computer system/server 12, system 60 can communicate with quarantine database 80 and exposure trend database 82.

System 60 may detect and assess evidence of malware intrusion by system scanner 62 performing one or more scans of a system, wherein the one or more scans detect evidence of malware intrusion, and wherein each of the one or more scans generates a respective result. Severity score assignor 64 assigns a severity score to each respective result of the one or more scans, and assessment score calculator 66 computes or calculates an assessment score for scanned system 100 based upon the severity score assigned by severity score assignor 64 to each respective result of the one or more scans.

Responsive to the assessment score computed or calculated by assessment score calculator 66 exceeding a pre-determined threshold, 2.5 in one example, forensic report generator 68 generates a forensic report for scanned system 100, wherein the forensic report comprises each respective result of the one or more scans by system scanner 62, the severity score assigned by severity score assignor 64 to each respective result, and the assessment score computed or calculated by assessment score calculator 66, and sends forensic report 300 (shown in FIG. 3) to system administrator 90.

Responsive to the assessment score computed or calculated by assessment score calculator 66 exceeding a pre-determined threshold, 2.5 in one example, system isolator 70 isolates and quarantines scanned system 100, where the quarantining comprises storing an identifier of the system in quarantine database 80 of quarantined systems, and removes scanned system 100 from at least one network using, in one example, via network adapter 20 (shown in FIG. 1).

Responsive to the assessment score computed or calculated by assessment score calculator 66 not exceeding a pre-determined threshold, 2.5 in one example, scanned system 100 is connected to at least one network, in one example, via network adapter 20 (shown in FIG. 1). In one embodiment, the one or more scans by system scanner 62 of scanned system 100 may be performed on a periodic basis.

In one embodiment, performing one or more scans of scanned system 100 may comprise scanning at least one of:

a system memory, a system storage, a web browser cache, an application update, an application patch, a windows management instrumentation (WMI) extension, and a windows registry update.

In one embodiment, performing one or more scans of scanned system 100 may comprise scanning for one or more malware intrusion artifacts comprising at least one of: a potentially unwanted application (PUA), a potentially unwanted program (PUP), and an exploit kit.

In one example, scanned system 100 may have a browser history connector, which enables access to browsing history of one or more web browsers used in conjunction with system 100. The browser history connector may use an access protocol to determine browser bookmarks, a history of websites that the browser has been used to visit, and files that have been downloaded using the browser. For example, the browser history connector may generate a list of URLs that have been visited, and files that have been downloaded within a given timeframe, in one example, the past twenty-four (24) hours.

In another example, scanned system 100 may have a Windows Management Instrumentation ("WMI") connector, which enables access to a history of events, for example, audit events such as authentication, changes to system settings, and execution of privileged tasks. The WMI connector may also actively monitor WMI to detect interactions by file-less malware, for example the setup of WMI hooks, or queries and calls to WMI endpoints or PowerShell endpoints.

Scanned system 100 may use the connectors described hereinabove to enable operating system software of system 100 to support discovery of potential attack vectors. The operating system of system 100 can also utilize connectors to scan logs for suspicious events, for example, unexpected execution of privileged tasks, deletion of logged events, or wholesale deletion of log files. Deletion of logged events or log files are examples of evidence which may constitute obfuscation of suspicious activities.

Referring now to FIG. 3 in connection with FIG. 2, forensic report 300, by way of example, is shown. Indicators of compromise may be detected by system scanner 62 (shown in FIG. 2), which also identifies malware intrusion techniques. Chances of compromise and a severity score are assigned by severity score assignor 64 (shown in FIG. 2) based on historical risk data in exposure trend database 82 (shown in FIG. 2), and for example, the score legend shown in FIG. 3. A total score of 2.97 is computed or calculated, in the present example, by assessment score calculator 66 (shown in FIG. 2). Further to the present example, if a total score of greater than 2.5 (2.97>2.5) is computed or calculated, forensic report generator 68 (shown in FIG. 2) generates a report which may be sent to a system administrator as an alert to take remedial action with respect to the system that was scanned.

Figure 4:
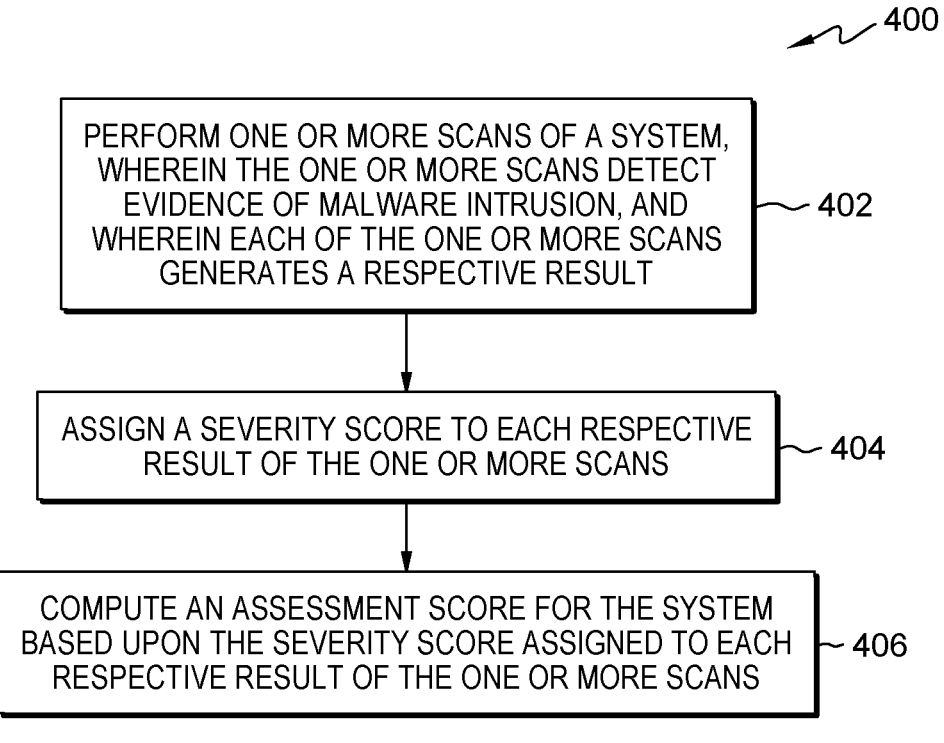
FIG. 4 shows a process flowchart for detecting and assessing evidence of malware intrusion according to illustrative embodiments.

As depicted in FIG. 4, in one embodiment, a system (e.g., computer system/server 12) carries out the methodologies disclosed herein. Shown is a process flowchart 400 for detecting and assessing evidence of malware intrusion. At 402, one or more scans of a system are performed, wherein the one or more scans detect evidence of malware intrusion, and wherein each of the one or more scans generates a respective result. At 404, a severity score is assigned to each respective result of the one or more scans. At 406, an assessment score is computed or calculated for the system based upon the severity score assigned to each respective result of the one or more scans.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for detecting and assessing evidence of malware intrusion. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for detecting and assessing evidence of malware intrusion. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to detecting and assessing evidence of malware intrusion. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for detecting and assessing evidence of malware intrusion, comprising:

performing a plurality of scans of a system in a networked computing environment, wherein each scan of the plurality of scans operates to detect indicators of compromise from a set of predefined indicators, different types of intrusion techniques for file-less malware intrusions are assigned to various sets of predefined indicators along with assigned chances of compromise for the different types of intrusion techniques, the assigned chances of compromise having corresponding severity scores based on a likelihood of a file-less malware intrusion having occurred in the system;

assigning a severity score to each positive scan result of the plurality of scans, the severity score corresponding to the type of intrusion technique and the indicator of compromise detected by each positive scan;

computing a current assessment score for the system based upon a combined value of the severity scores arising from the plurality of scans; and determining a level of scrutiny for the system based on the current assessment score.

2. The computer-implemented method of claim 1, further comprising:

responsive to the current assessment score exceeding a pre-determined threshold:

generating a forensic report for the system, wherein the forensic report comprises each positive scan result, the severity score assigned to each positive scan result, and the current assessment score; and sending the forensic report to a system administrator.

3. The computer-implemented method of claim 1, further comprising:

responsive to the current assessment score exceeding a pre-determined threshold, quarantining the system, wherein the quarantining comprises:

storing an identifier of the system in a database of quarantined systems, and removing the system from the networked computing environment.

4. The computer-implemented method of claim 1, further comprising:

responsive to the current assessment score not exceeding a pre-determined threshold, connecting the system to at least one network of the networked computing environment.

5. The computer-implemented method of claim 1, wherein the performing the plurality of scans of the system comprise scanning at least one of: a system memory, a system storage, a web browser cache, an application update, an application patch, a windows management instrumentation (WMI) extension, and a windows registry update.

6. The computer-implemented method of claim 1, wherein the performing the plurality of scans of the system comprise scanning for one or more malware intrusion artifacts comprising at least one of: a potentially unwanted application (PUA), a potentially unwanted program (PUP), and an exploit kit.

7. A computer system for detecting and assessing evidence of malware intrusion, the computer system comprising:

a memory medium comprising program instructions;

a bus coupled to the memory medium; and a processor, for executing the program instructions, coupled to a malware evidence detection engine via the bus that when executing the program instructions causes the computer system to:

perform a plurality of scans of a target system in a networked computing environment, wherein each scan of the plurality of scans operates to detect indicators of compromise from a set of predefined indicators, different types of intrusion techniques for file-less malware intrusions are assigned to various sets of predefined indicators along with assigned chances of compromise for the different types of intrusion techniques, the set of assigned chances of compromise having corresponding severity scores based on a likelihood of a file-less malware intrusion having occurred in the system;

assign a severity score to each positive scan result of the plurality of scans, the severity score corresponding to the type of intrusion technique and the indicator of compromise detected by each positive scan;

compute a current assessment score for the target system based upon a combined value of the severity scores arising from the plurality of scans; and determining a level of scrutiny for the target system based on the current assessment score.

8. The computer system of claim 7, the instructions further causing the computer system to:

responsive to the current assessment score exceeding a pre-determined threshold:

generate a forensic report for the target system, wherein the forensic report comprises each positive scan result, the severity score assigned to each positive scan result, and the current assessment score; and send the forensic report to a target system administrator.

9. The computer system of claim 7, the instructions further causing the computer system to:

responsive to the current assessment score exceeding a pre-determined threshold, quarantine the target system, wherein the quarantine comprises:

storing an identifier of the target system in a database of quarantined systems, and removing the target system from the networked computing environment.

10. The computer system of claim 7, the instructions further causing the computer system to:

responsive to the current assessment score not exceeding a pre-determined threshold, connect the target system to at least one network of the networked computing system.

11. The computer system of claim 7, wherein the plurality of scans of the target system comprise scans of at least one of: a system memory, a system storage, a web browser cache, an application update, an application patch, a windows management instrumentation (WMI) extension, and a windows registry update.

12. The computer system of claim 7, wherein the plurality of scans of the target system comprise scans for one or more malware intrusion artifacts comprising at least one of: a potentially unwanted application (PUA), a potentially unwanted program (PUP), and an exploit kit.

13. A computer-implemented method for assessing a computing system for prior file-less malware intrusions, the method comprising:

scanning a computing system for an indicator of compromise from a set of predefined indicators, wherein different types of intrusion techniques for file-less malware intrusions are assigned to various sets of predefined indicators along with assigned chances of compromise for the different types of intrusion techniques, the assigned chances of compromise having the set of predefined indicators having corresponding severity scores based on likelihood of a file-less malware intrusion having occurred;

for a first positive scan result detecting a first indicator of compromise, assigning, to the first positive scan result, a first severity score corresponding to a first type of intrusion technique for the first indicator of compromise;

for a second positive scan result detecting a second indicator of compromise, assigning, to the second positive scan result, a second severity score corresponding to a second type of intrusion technique for the second indicator of compromise;

computing a first assessment score for the computing system based on a combined value of assigned severity scores, including the first severity score and the second severity score, the first assessment score being a current assessment score until a next positive scan result is detected; and upon the current assessment score reaching a threshold assessment score, based on assessment scores from a plurality of periodic scans, taking a quarantine action on the computing system.

14. The computer-implemented method of claim 13, further comprising:

responsive to an initial assessment score being below the threshold assessment score, establishing a periodic basis for scanning the computing system.

15. The computer-implemented method of claim 14, wherein a first set of scans detected a set of indicators of compromise resulting in the initial assessment score being below the threshold assessment score.

16. The computer-implemented method of claim 13, wherein the scanning is performed after a potential file-less malware intrusion by accessing browsing history within a given timeframe.

17. The computer-implemented method of claim 13, wherein the quarantine action removes the computing system from at least one network of a networked computing environment.

18. The computer-implemented method of claim 13, where the likelihood of a file-less malware intrusion occurring is based on historical risk data.

\* \* \* \* \*